No. 883,049. PATENTED MAR. 24, 1908.
J. W. PIVER.
TONGUE AND GROOVE JOINT FOR FLOORING.
APPLICATION FILED SEPT. 12, 1907.
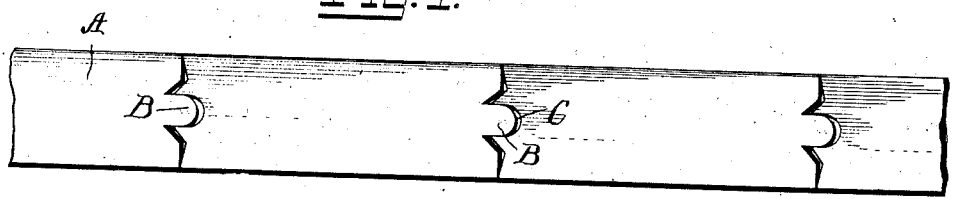
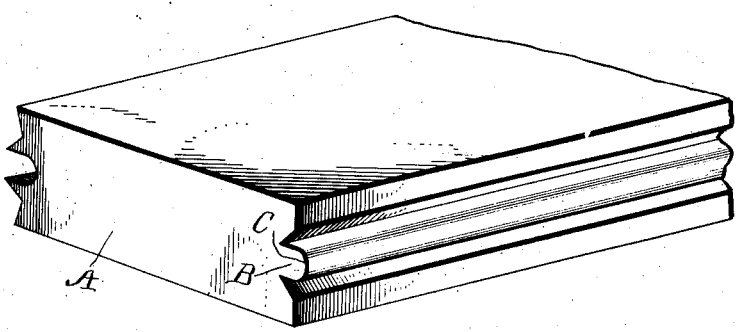
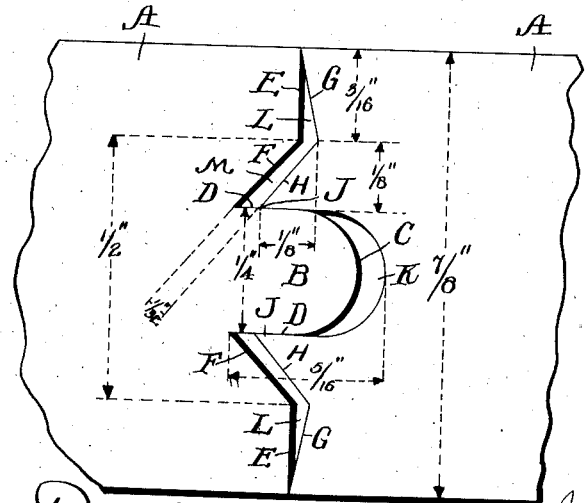

UNITED STATES PATENT OFFICE.

JOHN W. PIVER, OF LAKELAND, FLORIDA.

TONGUE-AND-GROOVE JOINT FOR FLOORING.

No. 883,049.   Specification of Letters Patent.   Patented March 24, 1908

Application filed September 12, 1907. Serial No. 392,590.

*To all whom it may concern:*

Be it known that I, JOHN W. PIVER, a citizen of the United States, residing at Lakeland, in the county of Polk and State of Florida, have invented certain new and useful Improvements in Tongue-and-Groove Joints for Flooring; and I do hereby declare the following to be a full, clear, and exact description of the invention, such as will enable others skilled in the art to which it appertains to make and use the same.

My invention relates to a tongue and groove joint for floorings, ceilings and so forth; and one of the objects of my invention is to produce such a joint, the parts of which shall be simple and easy to form as the lumber passes through the machine; another object of my invention is to produce such a joint which shall be easy and simple for the carpenters to put together when the flooring or ceiling is being put in place. But the main object of my invention is to produce a joint having the characteristics above described which shall, under all conditions, produce a smooth surface of the floor, ceiling or other covering, to which my invention may be applied.

As is well known, the tongue and groove joints now in common use are of standard dimensions for matched lumber and that in all cases the groove is one thirty-second of an inch larger than the tongue. The reason for this is that all lumber will expand and contract with different atmospheric conditions, and long experience has taught that some allowance must be made for such contraction and expansion, and that the standard allowance of at least one thirty-second of an inch is essential. The result is, in the present state of the art, that it is impracticable in actual use to employ a tongue and groove matched joint that is absolutely close fitting for floorings, ceilings, etc. That is to say, if the tongue and groove should be made of the same size so as to form a smooth surface when the flooring or ceiling is laid down, the lumber would expand and the tongue would be too large for the groove. Again, if we make the standard allowance of one thirty-second of an inch, as above stated, we will encounter a mismatch or uneven surface to the extent of that allowance when the flooring or ceiling is in place, still as stated above experience has shown that this allowance or clearance of one thirty-second of an inch is essential and it is universally found in the commercial lumber of this character of to-day.

A mismatch or an uneven surface is so objectionable, that in the present state of the art, in order to partially prevent the same this clearance of one thirty-second of an inch is provided in the groove, and the distance between the tongue and the bottom, or underside of the flooring, when it is laid down, is made the same in dimensions as the underside of the groove. In this form of joint the flooring is laid by nailing diagonally through the tongue, and when the underside of the groove fits beneath the said tongue, the groove being one thirty-second of an inch larger than the tongue, extends above the same, and thereby prevents a perfect match from being made. Furthermore, when this style of joint is adopted it requires greater skill on the part of the carpenters to lay said flooring than it does with my tongue and groove joint. As a matter of fact, in this latter method of making joints, the tongue and groove does not assist in making a smooth surface with the boards or planking, but they merely answer as a device to hide the nail driven through the tongue, and to thereby enable the carpenter to "secretly" nail the flooring strips to the floor sill or sub-floor. It is only the fact that the upper lip of the groove overlaps the upper surface of the tongue that enables the workman to make an approximate matched or smooth surface in such floorings or ceilings.

The main object of my invention, as above stated, being to overcome the above objections, my invention consists in the novel combination of parts more fully hereinafter described and particularly pointed out in the claims.

Referring to the accompanying drawings forming a part of this specification, Figure 1 represents a floor, ceiling or other covering, provided with the joint constituting my invention. Fig. 2 represents a section of a board provided with a tongue and groove made in accordance with my invention, and Fig. 3 represents the details of my joint on a greatly enlarged scale.

Like letters refer to like parts in all the views.

A represents a suitable board of any desired dimensions, that shown being the standard board of seven-eighths of an inch in thickness. On one edge of this board I form as it passes through the mill, a tongue B. This tongue is one-fourth of an inch in thickness and has a semi-cylindrical end C, as shown. This tongue is also provided with the flat surfaces D, joining the semi-cylindrical surfaces C, with the base of the tongue, as shown. These flat surfaces D are preferably about four thirty-seconds of an inch in extent. The edge of the board provided with this tongue has two perpendicular surfaces E extending from the outer surfaces of the board inward a distance of three-sixteenths of an inch, and also with two inclined surfaces F on each side of said tongue joining the inner extremities of said surfaces E, with the inner extremities of the said surfaces D, all as best shown in Fig. 3. The perpendicular distances from the inner extremities of said surfaces E to the said surfaces D are one-eighth of an inch. That edge of the board which is provided with the groove has two inclined surfaces G extending from the outer surface of said board inward a distance of three-sixteenths of an inch, and also with the oppositely inclined surfaces H co-extensive with the surfaces F above mentioned, terminating in the angular tongues J. Between these tongues, the board is provided with the groove K proper, the same size as the tongue proper, B; that is to say, of one-fourth of an inch in thickness. The outer extremities of the surfaces G and E meet at a sharp angle as shown, and the said surfaces diverge inward leaving the spaces L. The surfaces H and F likewise diverge as shown, leaving the spaces M.

It results directly from the construction just described, that since there is no clearance or enlargement of the groove K proper, over the tongue B, that when the tongue and groove come together there must be a perfect match. That is to say, the cause for mismatching in all the standard lumber now in use is completely done away with, and the upper surface of the tongue edge of the board must of necessity be on exact level with the upper surfaces of the groove edge of the board, and therefore a ceiling or floor provided with such a joint must be smooth, provided the edges of the two boards come together. As above stated, however, the lumber swells and the tongue becomes larger than the groove; and in the standard lumber, if the tongue and groove are of the same size, the one could not fit within the other. In my construction, by providing the sharp tongues J on the extremities of the groove, and flat surfaces D on the body of the tongue, as well as the semi-cylindrical surfaces C on the latter, I am enabled to force the tongue, within, the groove with great ease, notwithstanding the fact, that the tongue may be larger than the groove because the sharp tongue will expand easily and equally on each side constituting an expansion self centering joint. That is to say, any workman, whether skilled in his trade or not, can easily bring the semi-cylindrical surfaces C up to the aperture between the sharp tongues J and force the said surface C within the groove K proper, very much as a conical peg is forced into a hole. When this is done, the parts being of the dimensions above stated are compelled to fit closely together, and to form a perfectly smooth floor surface and of an exceedingly neat appearance. The surfaces E and F being oppositely inclined, and the surfaces G and H, being likewise oppositely inclined, but at a different angle, and thereby leaving the spaces L and M between said pairs of surfaces, it results that if any driving up or tightening of the joint is necessary after the nails have been driven through the tongue B, the same may be readily accomplished, for all that is necessary to do in order to drive the groove further upon the tongue B is to merely apply force and thereby reduce the spaces L and M, and cause the sharp tongues J to approach more nearly to the base of the tongue B.

In a floor such as that just described, it will be seen, that I do not need any filling of lead or other material as is ordinarily applied to floors to fill up the small cracks that are inevitably left between the boards, but of course, if desired, such a filling can be applied in order to more firmly cement the joints together.

In my former Patent #624,862, dated May 9th, 1899, I disclosed a joint somewhat similar to the above, but the same did not possess the above features of this joint as will be apparent by a comparison of the drawings of said patent with the drawings of this application. It will be further seen that the objects of my invention are accomplished by this simple structure, in that all of the parts are easily and simply made, while the lumber is passing through the mill and that a perfectly smooth surface may be obtained by an unskilled workman, in any floor or ceiling to which my joint may be applied.

What I claim is:—

1. A board having on one edge thereof a tongue provided with a semi-cylindrical outer edge C and flat parallel sides D, D, said board also provided with the flat surfaces E, E, extending substantially perpendicular to the outer faces of the board, and with the inclined surfaces F joining said surfaces E and D, substantially as described.

2. A board having a tongue on one edge, and a groove K on the other of a width the same as the thickness of the said tongue, said latter edge also provided with the inclined surfaces G, G, extending inward from the outer faces of said board, and with the surfaces H extending at an obtuse angle to the said surfaces G, G, and joining the latter with the outer edges of the groove K, thereby forming the sharp tongues J, substantially as described.

3. A matched floor having a smooth surface composed of boards having on the one edge thereof a tongue provided with a semi-cylindrical outer edge C, and flat parallel sides D, D, said board also provided with the flat surfaces E, E, extending substantially perpendicular to the outer faces of the board, and with the inclined surfaces F joining said surfaces E and D, and said boards having on the other edge thereof a groove K of a width the same as the thickness of the said tongue, said latter edge also provided with the inclined surfaces G, G, extending inward from the outer faces of said board, and with the surfaces H extending at an obtuse angle to the said surfaces G, G, and joining the latter with the outer edges of the groove K, thereby forming the sharp tongues J, substantially as described.

4. A matched floor having a smooth surface composed of boards having on the one edge thereof a tongue provided with a semi-cylindrical outer edge C and flat parallel sides D, D, said board also provided with the flat surfaces E, E, extending substantially perpendicular to the outer faces of the board, and with the inclined surfaces F joining said surfaces E and D and said boards having on the other edge thereof a groove K of a width the same as the thickness of the said tongue, said latter edge also provided with the inclined surfaces G, G, extending inward from the outer faces of said board, and with the surfaces H extending at an obtuse angle to the said surfaces G, G, and joining the latter with the outer edges of the groove K, thereby forming the sharp tongues J and the spaces L and M on each side of said tongue, substantially as described.

5. A joint for matched floors composed of boards having a groove K provided with parallel straight walls, a curved bottom, and sharp tongues J at the outer extremities of said groove, and said boards also provided with a tongue B of a thickness equal to the width of said groove, said tongue having parallel flat walls matching the walls of said groove, and also having a semi-cylindrical outer edge C, whereby the ready entrance of said tongue B in between the said tongues J, is facilitated, and said boards also having means enabling their extreme outer corners or edges to come into touching contact, substantially as described.

6. A joint for matched floors composed of two boards one of which is provided with a groove having sharp tongues J, and the other with a tongue of the same dimensions as said groove provided with a semi-cylindrical edge C and the flat surfaces D, D, substantially as described.

In testimony whereof, I affix my signature, in presence of two witnesses.

JOHN W. PIVER.

Witnesses:
W. F. JOHNSON,
R. P. JOHNSON.